United States Patent
Miller et al.

(10) Patent No.: US 7,149,810 B1
(45) Date of Patent: Dec. 12, 2006

(54) SYSTEM AND METHOD FOR MANAGING CALENDAR ITEMS

(75) Inventors: Bradley D. Miller, San Jose, CA (US); Shilpa Jain, San Leandro, CA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 10/448,533

(22) Filed: May 30, 2003

(51) Int. Cl.
G06F 15/16 (2006.01)
(52) U.S. Cl. ............... 709/246; 709/206; 709/223; 718/102; 715/963
(58) Field of Classification Search .............. 709/206, 709/246, 223; 715/963; 718/100, 102, 101
See application file for complete search history.

(56) References Cited

U.S. PATENT DOCUMENTS

| | | | |
|---|---|---|---|
| 5,902,352 A * | 5/1999 | Chou et al. ............... | 718/102 |
| 5,907,829 A * | 5/1999 | Kida ........................ | 705/9 |
| 5,936,625 A * | 8/1999 | Kahl et al. ................ | 715/775 |
| 6,370,554 B1 | 4/2002 | Sun-Woo .................. | 708/112 |
| 6,480,830 B1 * | 11/2002 | Ford et al. ................ | 705/9 |
| 6,732,080 B1 * | 5/2004 | Blants ....................... | 705/9 |
| 7,046,676 B1 * | 5/2006 | Goetzinger et al. ...... | 370/395.4 |
| 2001/0000194 A1 * | 4/2001 | Sequeira .................... | 725/39 |
| 2001/0049617 A1 * | 12/2001 | Berenson et al. ......... | 705/8 |
| 2002/0029238 A1 * | 3/2002 | Okuhata .................... | 709/101 |
| 2002/0196280 A1 * | 12/2002 | Bassett et al. ............ | 345/751 |
| 2003/0121050 A1 * | 6/2003 | Kalva et al. ............... | 725/97 |
| 2003/0131073 A1 * | 7/2003 | Lucovsky et al. ......... | 709/219 |
| 2004/0054726 A1 * | 3/2004 | Doss et al. ................ | 709/205 |
| 2004/0064567 A1 * | 4/2004 | Doss et al. ................ | 709/228 |
| 2004/0064585 A1 * | 4/2004 | Doss et al. ................ | 709/246 |
| 2006/0190485 A1 * | 8/2006 | Adams et al. ............. | 707/104.1 |

OTHER PUBLICATIONS

Dawson et al., "Internet Calendaring and Scheduling Core Object Specification (iCalendar)", RFC2445, Nov. 1998.*
RD 34902 8A, May 1993.*
Glezer, C., and S.B. Yadav, "A Conceptual Model of an Intelligent Meeting-Scheduler," *Journal of Organizational Computing and Electronic Commerce* 9(4), 233-251, 1999.
Sen, S., "Developing an Automated Distributed Meeting Scheduler," *IEEE Expert* 12(4):41-45, Jul./Aug. 1997.

* cited by examiner

*Primary Examiner*—Philip Tran
*Assistant Examiner*—Oanh Duong
(74) *Attorney, Agent, or Firm*—Christensen O'Connor Johnson Kindness PLLC (57) ABSTRACT

A system and method for managing calendar items in a calendar software application. The method and system preserve calendar data associated with past dates. In addition, the method and system manage modification requests associated with future dates. In response to a request to modify a calendar item, the calendar item can be selectively updated by a user if the calendar item is activated and if the calendar item is scheduled in the future. A calendar item is activated if its data has been viewed by a user. The present invention also provides an interface tool for allowing users associated with a calendar item to selectively update their calendars in response to a modification request.

13 Claims, 10 Drawing Sheets

SYSTEM AND METHOD FOR MANAGING CALENDAR ITEMS

FIELD OF THE INVENTION

The present invention relates to computer programs and, in particular, a method and system for managing calendar items in a software application.

BACKGROUND OF THE INVENTION

Calendar software applications have become a common management tool in many office environments. Many calendar software applications allow users to create and store calendar items in a computer to keep track of an event such as a meeting, an appointment, etc. A calendar item, which is a discrete collection of information that represents an event, can be used to store data that describes the event, data that identifies the time of the event, and other data that is related to the event. The other data may be in the form of a document or other type of data file. Many calendar software applications allow an event organizer to list the names of other users in a calendar item in a way that invites the listed users to the event. When an event organizer lists other users in a calendar item, the calendar item and all of its related data are sent to each listed user for storage in the personal calendar databases of each listed user. Many calendar software applications also send an electronic notification to each listed user, which allows each listed user to accept or deny the storage of the calendar item in their personal calendar database.

Although existing calendar software applications are suitable for performing the aforementioned tasks, existing calendar software applications have certain drawbacks. For example, existing calendar software applications do not have features for protecting the integrity of data stored in a calendar database. For example, if a user instructs a system to delete a calendar item that represents an event that occurred in the past, most existing systems immediately delete the calendar item. When calendar items of past events are deleted or modified, the data stored by the calendar software application does not provide an accurate record of past events. As a result, existing calendar software applications cannot be relied on to provide an accurate source of data if a user needs to access, review, or monitor records of past events.

The above-described problem is exacerbated when users modify a series of events, also referred to as a series of recurring calendar items. For example, if a user creates a series of recurring calendar items that represents a weekly recurring event for an entire calendar year and then deletes or modifies the series of calendar items, most existing calendar software applications immediately delete or modify all of the calendar items that have occurred in the past as well as all future calendar items. Thus, important stored data associated with past calendar items, which may not be recalled by the user, may be inadvertently deleted or modified by one command. This loss of past event data presents a significant obstacle if it becomes necessary to recall records of past events.

In addition to the drawbacks caused by the modification or deletion of calendar items of past events, a modification to a series of recurring calendar items may cause other problems when a number of users are listed in each recurring calendar item. For example, when an organizer modifies a series of calendar items, many existing systems simply provide each listed user with a request to approve or deny the modification. If a user approves the modification, most systems simply apply the modification to all related calendar items. Thus, existing systems do not allow each listed user to readily control and modify each calendar item that is stored in their personal calendar database.

As will be readily understood from the foregoing, there is a need for an improved system and method for managing calendar items in a calendar software application that allows users to modify calendar items without manipulating past calendar items. In addition, there exists a need for an improved system and method that allow users to manage and modify individual calendar items when a modification is made to a series of individual calendar items.

SUMMARY OF THE INVENTION

The present invention is directed to a system and method for managing calendar items in a calendar software application. In accordance with one aspect, the present invention provides a method and system for preserving calendar data related to past events, i.e., past calendar items. In accordance with another aspect, the present invention provides a method and system for managing modification requests of calendar items. Among many other benefits, the present invention allows calendar software applications to be relied on to provide an accurate source of calendar data that can be used to track, monitor, and access past events. The present invention also provides an improved mechanism that allows users to selectively update data stored in a personal calendar database when a request is made to modify a calendar item.

For illustrative purposes, a calendar item is a discrete collection of information that may be used to represent an event, such as a meeting, appointment, etc. A calendar item may store data that indicates a particular time of the event, which may include a time of day and a date. The calendar item may also store other data that describes the event and still other data related to the event. The related data may be in the form of an attached document or a data file. In accordance with one aspect of the present invention, a calendar item may be assigned an "activated" status if a user accesses the data of the calendar item. For example, if a user selects a calendar item from a menu of calendar items for viewing, a flag associated with the calendar item may be set to indicate the activated status for that calendar item.

One method formed according to the invention includes the creation of a plurality of calendar items. Each calendar item includes a particular event time and other information. After the plurality of calendar items is created, the status of any calendar item is designated activated when a user accesses the calendar item. In addition, users can modify the data of one or more selected calendar items by creating a modification request.

When a user creates a request to modify the data of one or more selected calendar items, the system analyzes each selected calendar item to determine if the data of each selected calendar item should be modified. For example, each selected calendar item may be analyzed to determine if the status of the item is activated. Any selected item whose status is not activated may be deleted. Then a display requesting one or more update commands may be generated for each select calendar item that is designated activated and scheduled to occur in the future, i.e., scheduled to occur after the modification request is made. The displays requesting the update commands for each selected calendar item allow users to separately update each calendar item. Thus, problems caused by systems that automatically delete or modify every calendar item upon the receipt of a modification or delete request are eliminated.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following description of the present invention first provides an overview of a computer system in which the present invention may be implemented. Following that, a description of a method for managing calendar items shown in accompanying flow diagrams is described. In addition, various exemplary graphical user interfaces for displaying calendar data included in the accompanying diagrams are described.

Figure 1:
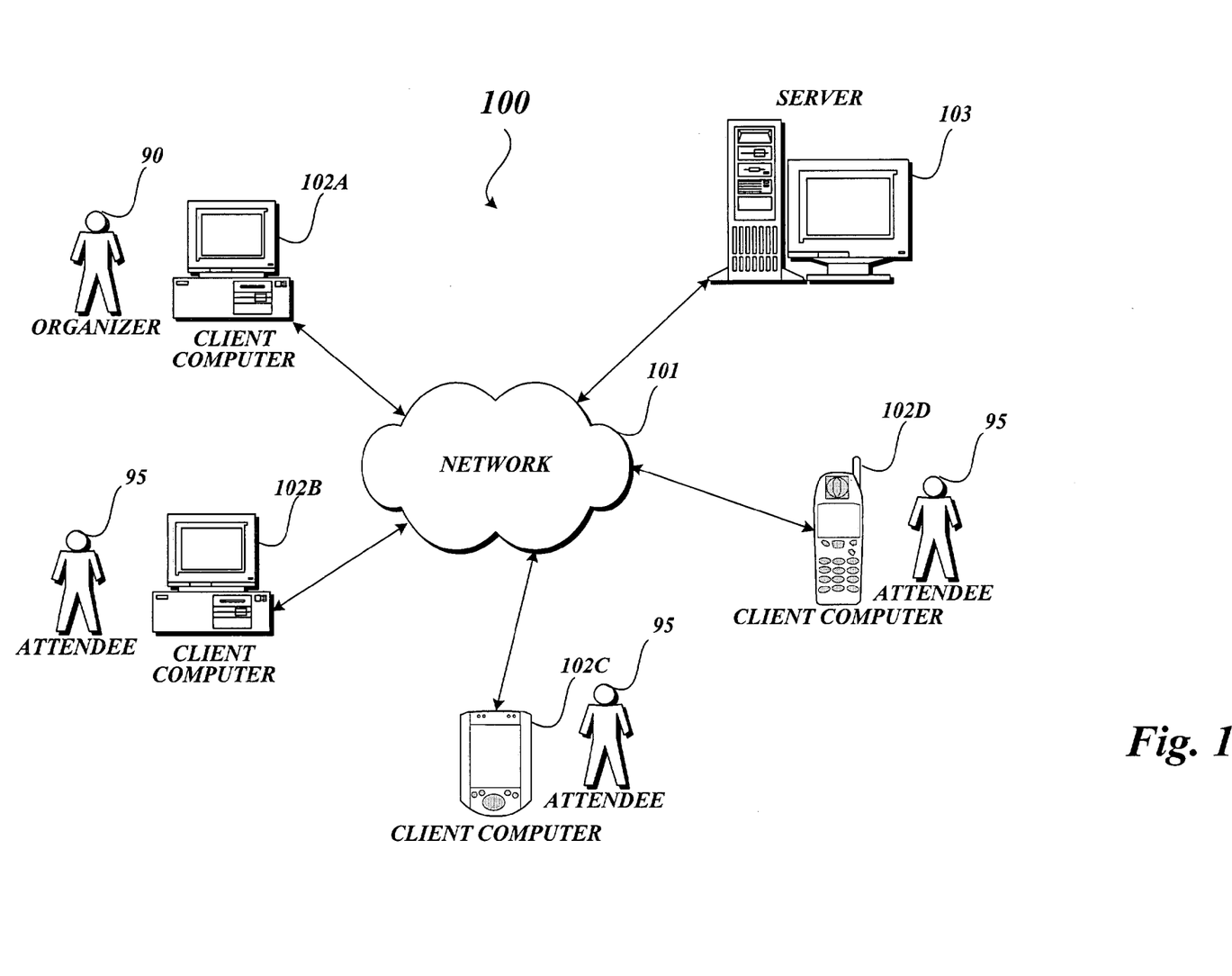
FIG. 1 is a pictorial diagram of a number of computers connected to a network, including a number of client computers and a server for allowing a number of users to communicate via client-server software applications.

Referring to FIG. 1, the following is intended to provide an exemplary overview of one suitable computer system 100 in which the invention may be implemented. Generally described, the computer system 100 may comprise a plurality of client computers 102A, 102B, 102C, 102D and at least one server 103. The client computers may be formed by personal computers (PCs), including portable PCs 102A, 102B, personal digital assistants (PDAs) 102C, a telephone 102D, etc. The client computers and the server depicted in FIG. 1 are configured to electronically communicate via a network 101. The network may be a local area network (LAN) or a larger network, such as a wide area network (WAN) or the Internet. As known to those having ordinary skill in the art or other, the computer system 100 may be configured to exchange documents, commands, and other known types of information between the client computers 102A, 102B, 102C, 102D and the server 103. As will be appreciated by those skilled in the art and others, the computer system 100 shown in FIG. 1 is a simplified example of one suitable system for implementing the present invention and that the present invention is not limited to this example.

When calendar software formed in accordance with this invention is implemented in a computer system 100 of the type illustrated in FIG. 1, the invention provides a way for users to communicate, store, and organize calendar data. For instance, one user, such as a meeting organizer 90, can create a calendar item for storage on the server 103. During the creation of the calendar item, the meeting organizer 90 will list the names of other users, depicted as meeting attendees 95. The calendar data is shared with the other users that are scheduled to attend particular events, such as meetings. After a calendar item is created, the meeting organizer 90 and meeting attendees 95 can access and modify the calendar data associated with the calendar item. Examples of commercially available calendar software applications that provide the aforementioned functionality include applications such as Microsoft Outlook® and Microsoft Share-Point®.

Figure 2:
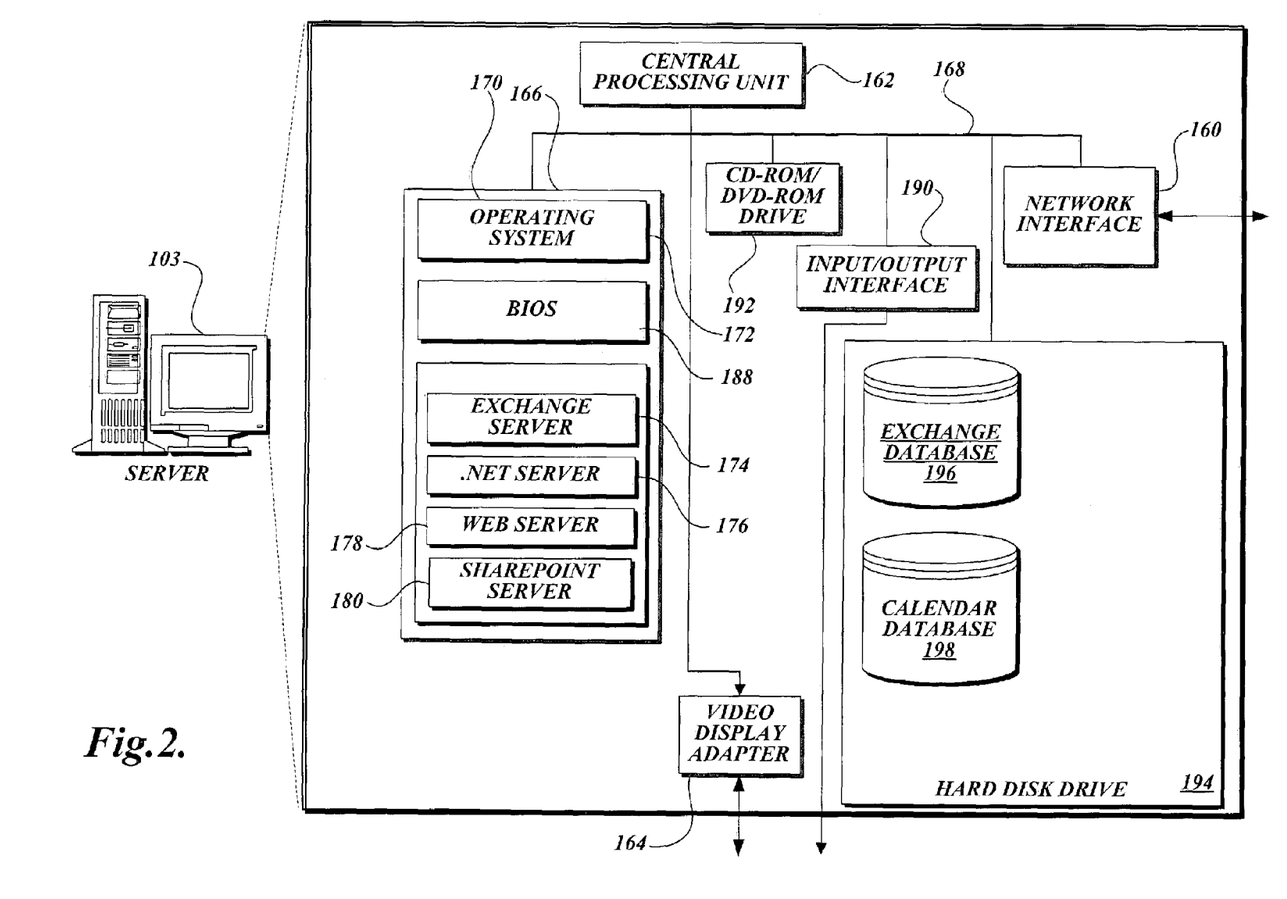
FIG. 2 is a schematic block diagram of an exemplary embodiment of the server depicted in FIG. 1.

FIG. 2 depicts an exemplary computer architecture of a server 103 suitable for use in a system of the type shown in FIG. 1. Those of ordinary skill in the art and others will appreciate that the server 103 may (and likely will) include many more components than those shown in FIG. 2. However, it is not necessary that all of these generally conventional components be shown in order to disclose an illustrative server suitable for use in practicing an embodiment of the present invention. As shown in FIG. 2, the server 103 is connected to a network via a network interface 160. Those of ordinary skill in the art will appreciate that the network interface 160 includes the necessary hardware and software for allowing the server 103 to communicate with other computers connected to the network by the use of one or more suitable communication protocols, such as the TCP/IP protocol.

The server 103 also includes a central processing unit (CPU) 162, a video display adapter 164, and mass memory 166, all connected together and to the network interface 160 by a bus 168. The mass memory 166 generally comprises RAM, ROM, and permanent mass memory, such as a hard disk drive, tape drive, optical drive, floppy disk drive, or combination thereof. The mass memory device 166 stores an operating system 170 for controlling the operation of the server 103. As is known to those of ordinary skill in the art, the operating system may be formed by a general-purpose server operating system such as UNIX, LINUX™, or a Microsoft® server operating system. A binary input/output system ("BIOS") 188 for controlling the low-level operation of server 103 is also stored in the mass memory device 166.

The mass memory device 166 also stores the program code and data for providing a Web or other network site that allows users to request, receive, and view information and data files stored in the server 103. Thus, the mass memory device 166 may store a Web server application 178, which may be any one of a number of commercially available software packages. The Web server application 178 comprises computer executable instructions that, when executed by the server 103, generate configurable markup documents to be displayed, such as the sample markup documents shown in FIGS. 5, 8, and 9 and described below. The Web server application 178 may be configured with a commercially available software component, such as a SharePoint® program component, that facilitates the functions described below. The mass memory device 166 also stores other software components that facilitate various other functions of the present invention. More specifically, the software components for performing the methods of the present invention may be supported by or included as part of one or more commercially available software applications, such as an Exchange® server 174, a .NET® server 176, or a SharePoint® server 180.

The server 103 may also include an input/output interface 190 connected to the bus 168 for communicating with external devices, such as a mouse, keyboard, scanner, or other input devices not shown in FIG. 2. Likewise, the server 103 may further include additional mass storage facilities such as CD-ROM/DVD-ROM drive 192 and large capacity hard disk drive 194, also connected to the bus 168. The hard disk drive 194 may be utilized by the server 103 to store several databases. In particular, the hard disk drive 194 may store an Exchange® database 196 and a calendar database 198 for use by the Exchange® server 174 and the SharePoint® server 180, respectively. As will be appreciated by those of ordinary skill in the art or other, the Exchange® database 196 and the calendar database 198 may be configured to store data in any one of a number of formats suitable for storing calendar data. For instance, the Exchange® and calendar databases 196 and 198 may be configured to store dates, times, and other data that may be related to particular calendar items. The Exchange® database 196 may also store other types of information such as e-mail records, task records, personal contact records, and the like. Although this illustration includes examples of specific software applications and databases, it is to be understood that this should be taken as exemplary and not limiting.

Client computers 102A, 102B, 102C, 102D shown in FIG. 1 may be formed from any one of a number of different computer products. In addition to the examples described above, the client computer also may be formed by a server or a two-way pager. As will be appreciated by those of ordinary skill in the art or others, the architecture of the client computer 102A, 102B, 102C, 102D may take on any suitable form, such as the computer architecture illustrated in FIG. 2. In any event, the client computer 102A, 102B, 102C, 102D includes a network interface for providing communication with the network 101. The network interface may be configured for use with any wired or wireless network connection, and may be used with any suitable communication protocol, such as the TCP/IP protocol. In addition, the client computer includes a processing unit, a display, and a memory unit. The memory unit may store the program code necessary for operating the client computer 102 and for generating a graphical user interface (GUI) on the display. In addition, the memory unit stores a client calendar program, such as Microsoft® Outlook®; and a Web browser application, such as Microsoft® Internet Explorer®.

The computer system 100 stores software programs that, when executed, implement the present invention. When executed, the computer system 100 creates, modifies, and updates calendar items stored in a calendar database. As described more fully below, among many other benefits, the present invention provides for the storage of calendar items in a way that allows a user to track, monitor, and access data related to past events. The present invention also provides an improved mechanism that allows users to control updates to their personal calendar items when a calendar item modification request is received.

As summarized above, a calendar item is a discrete collection of information that may be used to represent an event, such as a meeting, appointment, etc. A calendar item includes data that indicates a particular time of the event, which may include a time of day and a date. The calendar item may also include data related to the event, which may be in the form of attached documents or data files. In accordance with one aspect of the present invention, a calendar item is assigned an "activated" status if a user accesses the calendar item. For example, if a user selects a calendar item from a menu of calendar items for viewing of the calendar data, a flag associated with the calendar item is set to indicate the activated status for that calendar item. As will be appreciated by those of ordinary skill in the art, calendar items may be stored in a computer in a number of different formats. In one exemplary embodiment, the calendar items are stored in a standardized format, such as one formed in accordance to the ISO 8601 standard.

For illustrative purposes, the following description refers to various steps of modifying and processing of stored data that represents individual calendar items. For purposes of illustrating one exemplary implementation of the present invention, calendar items are described as stored in a central storage location, such as the calendar database 198 shown in FIG. 2. In one specific embodiment, the methods described below apply to calendar items exclusively stored in a server database. Thus, in specific embodiment, the methods described below do not apply to calendar items stored in a client application database, such as an Outlook® database. This should be taken as exemplary, not limiting. As will be appreciated by those of ordinary skill in the art and others, the methods of the present invention may also apply to calendar items that are stored in other types of databases and/or different types of computers.

Figure 3:
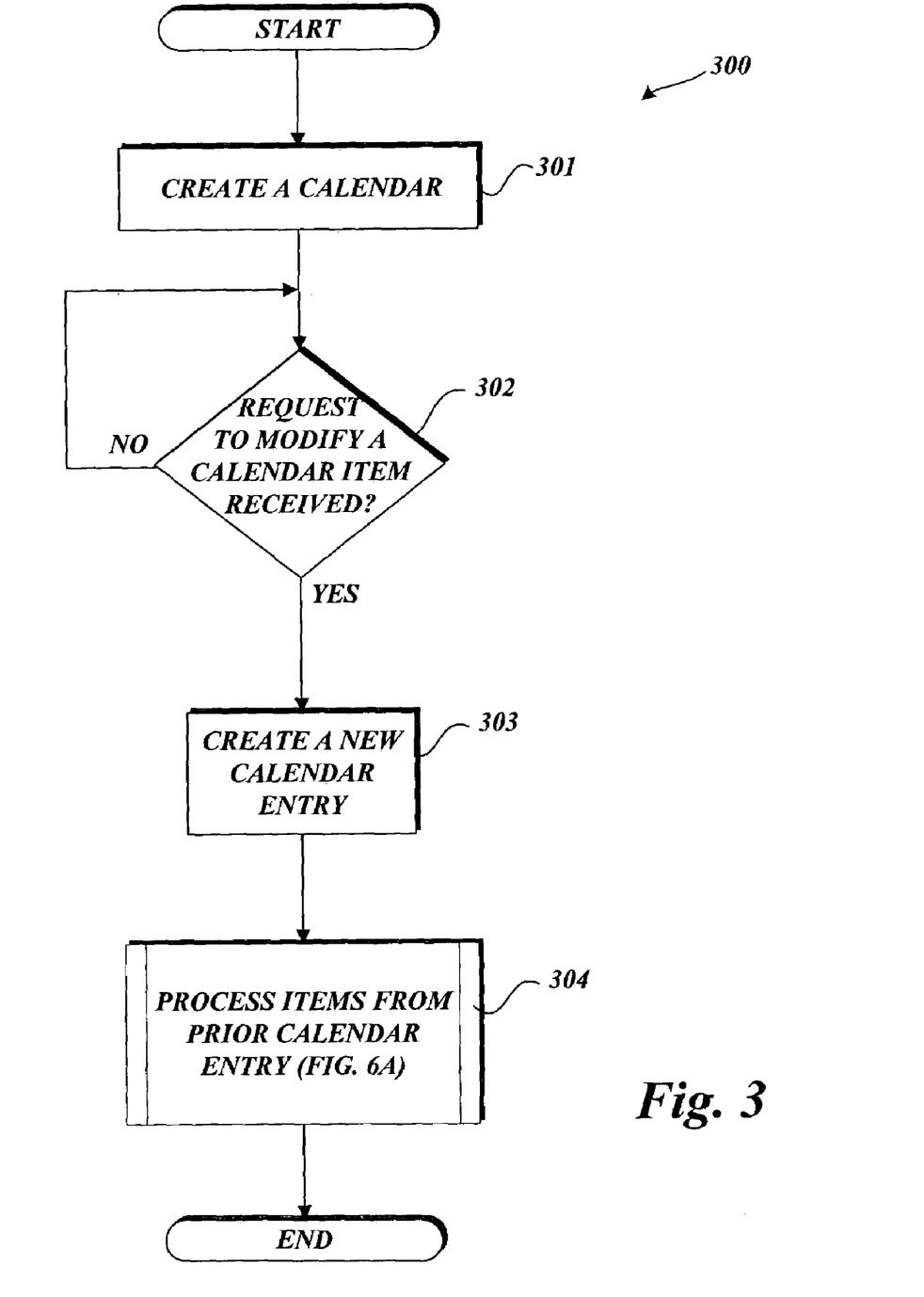
FIG. 3 is a flow diagram illustrating an exemplary method for creating, modifying and processing data associated with a calendar item according to the present invention.

FIG. 3 is a flow diagram illustrating one exemplary embodiment of a calendar data processing method 300 for managing calendar items. Generally described, the calendar data processing method 300 manages calendar items by selectively modifying created calendar items based on the receipt of modification requests and user input. With reference to the block flow diagram of FIG. 3 and the screen diagrams of FIGS. 4 and 5, an exemplary calendar data processing method 300 will now be described.

The calendar data processing method 300 begins at block 301, where a calendar entry is created. The calendar entry may be formed by a single item or a series of recurring items, such as a periodic meeting. The calendar entry may be created by any suitable calendar software application, such as Microsoft® Outlook®, Microsoft® SharePoint®, or other like software application. In such conventional software applications, graphical user interfaces generated by the application or graphical user interfaces generated by a markup document displayed on a browser application are used to interface with users.

Figure 4:
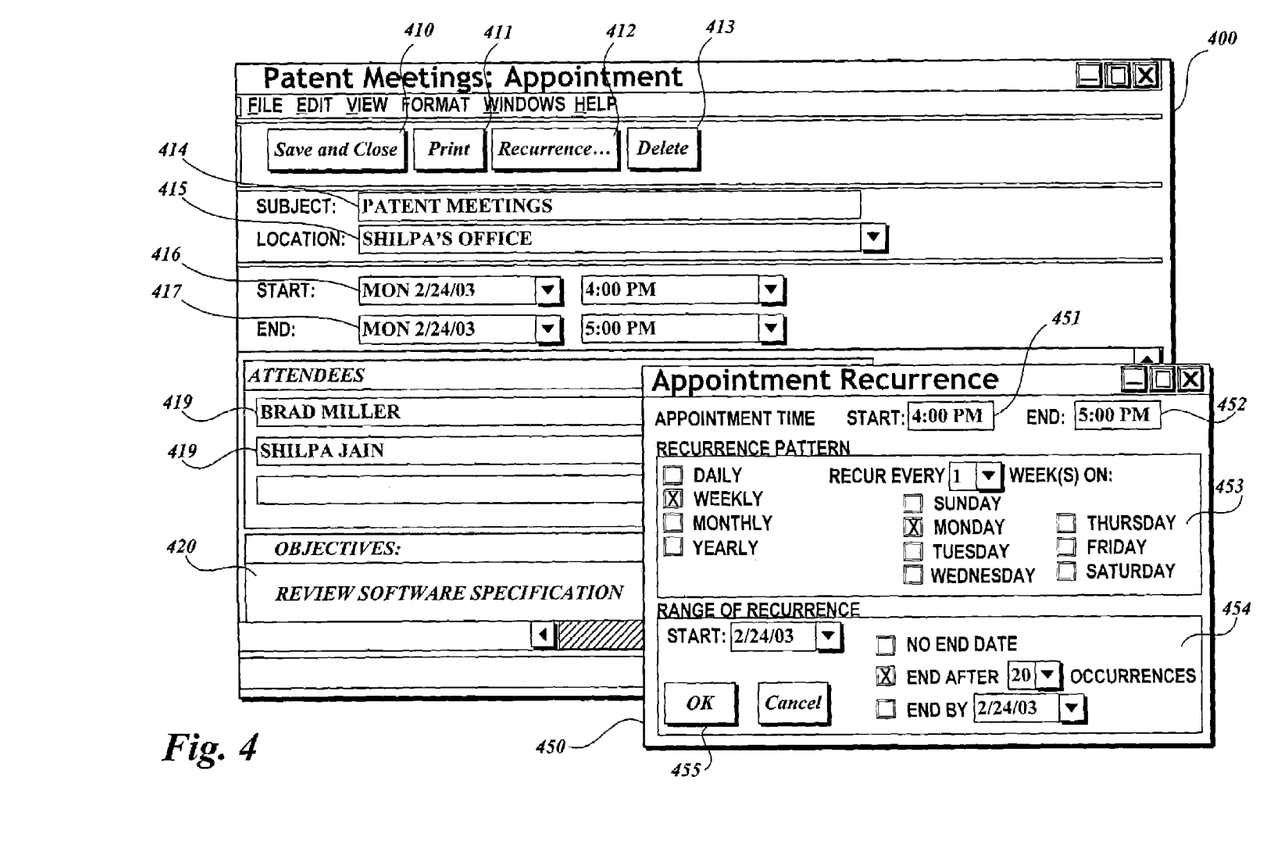
FIG. 4 is a pictorial diagram illustrating two exemplary conventional graphical user interfaces for inputting data associated with a calendar item.

FIG. 4 is a pictorial diagram illustrating two exemplary graphical user interfaces configured to receive data that is used to create a calendar item. The first interface, referred to as a scheduler interface 400, receives the calendar data. The scheduler interface 400 comprises several text entry fields and a number of corresponding text displays, each providing a description of the data to be entered into a related text entry field. Specific to this illustrative example, the scheduler interface 400 is configured to receive "subject" data 414 and "location" data 415 for describing the nature and location of the event represented by the calendar item. The scheduler interface 400 is also configured to receive "start" data 416 and "end" data 417. The start and end data may include a date and a time that defines the start time and duration of the event represented by the calendar item. The scheduler interface 400 also includes several additional text entry fields for receiving other information, such as the names 419 of attendees to be invited to the event and an objective description 420.

The exemplary scheduler interface 400 also includes a plurality of control buttons 410–413 that allow a user to control the functions of the scheduler interface 400. More specifically, the exemplary scheduler interface 400 includes a "save" button 410, a "print" button 411, and a "delete button" 413 for instructing the system to store, print, or delete received calendar data. In response to the actuation of the "save" button 410, the system may, for example, transmit all of the calendar data entered in the scheduler interface 400 to a server (103 of FIG. 1) for storage, assuming the calendar software application that includes the scheduler interface is running on a client computer.

The scheduler interface 400 also provides a "recurrence" button 412 that allows a user to create multiple instances of a calendar item. In this embodiment, a recurrence interface 450 is generated and displayed when the "recurrence" button 412 is actuated. As shown in FIG. 4, the recurrence interface 450 provides a number of fields for receiving data describing a recurrence pattern of a plurality of calendar items. In this specific example, the recurrence interface 450 receives data that describes an interval in which a calender item is to be repeated. More specifically, the exemplary recurrence interface 450 provides a recurrence pattern menu 453 for receiving information describing the recurrence pattern for the calendar item. The exemplary recurrence pattern menu 453 provides for the selection of a daily, weekly, monthly, or yearly interval. For weekly intervals, the recurrence pattern menu 453 also provides for the selection of at least one day of the week in which the calendar item is to be repeated.

The exemplary recurrence interface 450 shown in FIG. 4 also includes a range menu 454 that allows a specific number of occurrences to be selected, or allows dates defining the first date and last date of a recurring event to be entered. In FIG. 4, the chosen selections define a recurring calendar item that starts on Feb. 24, 2003, and recurs each Monday for 20 weeks. After the calendar data is entered in the text entry fields, actuation of an "OK" button 455 causes the calendar data to be stored. The calendar data may be stored in a local database on a client computer, an Exchange® database, a SharePoint® calendar database, or a combination thereof. The exemplary interfaces illustrate one way to carry out the process of block 301 of FIG. 3. The exemplary interfaces are provided for illustrative purposes and should not be construed as limiting.

Figure 5:
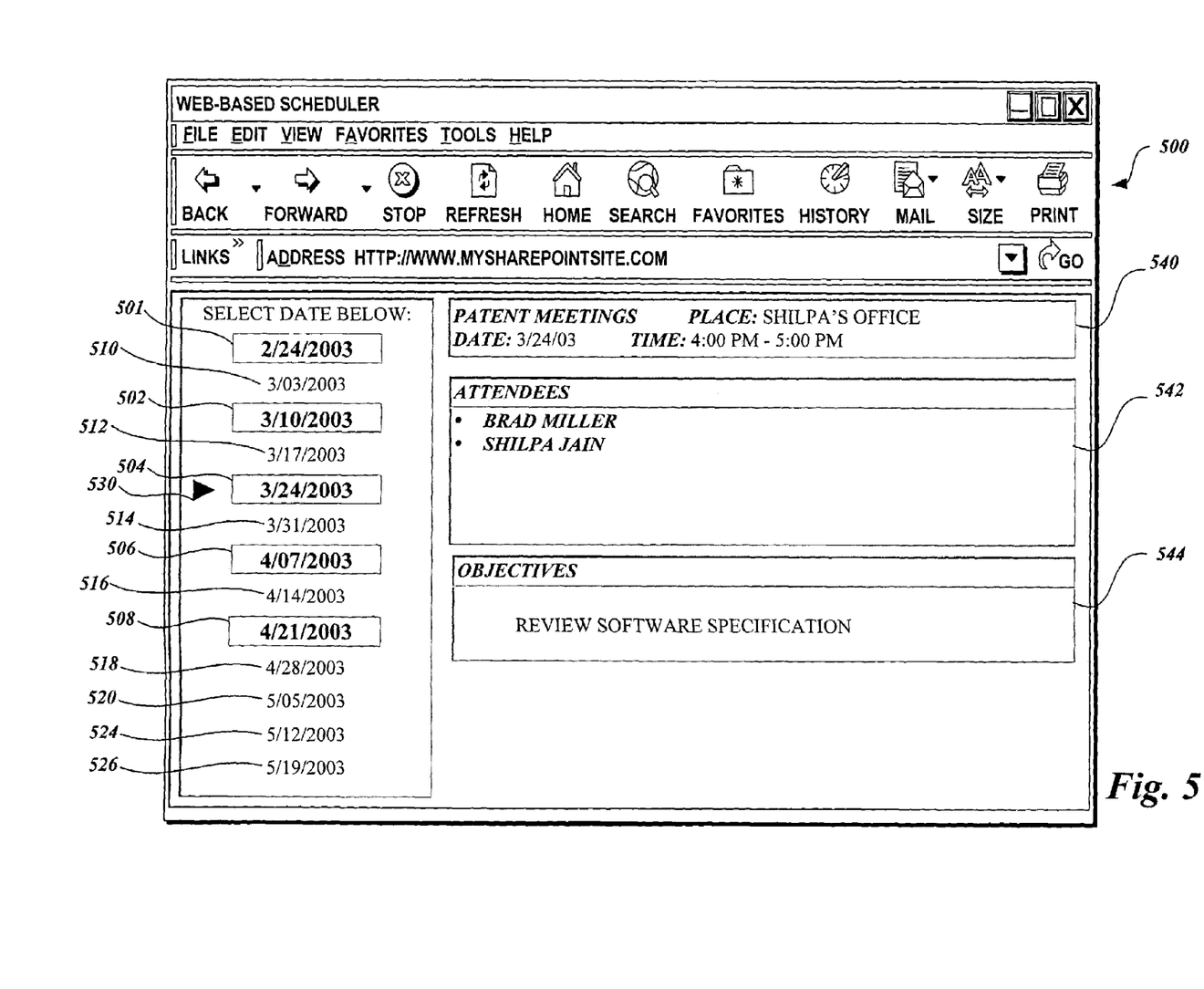
FIG. 5 is a pictorial diagram illustrating an exemplary graphical user interface for displaying data associated with a calendar item according to the present invention.

After a calendar item or a series of recurring calendar items is created and stored, the calendar items may be displayed on client computers programmed to access the resulting calendar. A variety of stand-alone or client-server software applications may be used to display the calendar item. In one illustrative example, a SharePoint® server application (180 of FIG. 2) operates in concert with a Web server application (178 of FIG. 2) to dynamically generate markup documents for displaying calendar items on a client computer, FIG. 5 is one example of a graphical user interface, also referred to as a calendar interface 500, suitable for displaying one or more calender items. The exemplary calendar interface 500 displays a list of calendar items, such as the series of calendar items created in the example illustrated in FIG. 4 and described above. More specifically, the calendar interface 500 shown in FIG. 5 comprises a list of selectable hyperlinks 501–526, each hyperlink representing an individual calendar item. The calendar interface 500 includes a display region displaying calendar data for a selected calendar item upon actuation of the related hyperlinks. FIG. 5 includes a display of the data associated with the fourth calendar item 504. The displayed calendar data includes attendee data 542, event description data 540, and objective data 544. In this exemplary embodiment, the calendar interface 500 also includes a date indicator 530 that marks the date associated with the displayed calendar data, i.e., the fourth calendar item 504. As will be appreciated by those of ordinary skill in the art or other, the calendar interface 500 may be configured to display other links and data related to the calendar item, such as a link to an attached document, hyperlinks to other Web sites, etc.

In accordance with this invention, the calendar interface 500 also highlights or in some other manner brings focus to hyperlinks associated with calendar items that have been activated. As described above, the status of a calendar item is changed to activated when a user access, i.e., displays or sends a request to display, the calendar item data. In the illustrative example shown in FIG. 5, the activated calendar items are associated with hyperlinks 501, 502, 504, 506, and 508, as shown by these hyperlinks being displayed in bold text. Hyperlinks associated with calendar items that have not been activated are displayed in regular text. In addition to the use of bold text, other visual indicators may be used to distinguish hyperlinks associated with activated calendar items from hyperlinks associated with other displayed calendar items.

Returning now to the flow diagram of FIG. 3, after a calendar entry formed of one or more calendar items is noted, the calendar data processing method 300 continues at block 302 where the method waits for a request to modify the calendar entry from a user authorized to modify (or delete) the calendar entry. A user creates a modification request to change the calendar entry using the conventional methods employed by the calendar software application used to create the calendar entry that is to be modified or deleted. More specifically, a user creates a modification request by entering modification data into the graphical user interface of the calendar software application. Depending on implementation details, if necessary, the calendar software application may send the modification data from a client computer application to a server application, such as a SharePoint® server application (180 of FIG. 2) for processing.

Using the scheduler interface 400 shown in FIG. 4 as an example, a user may cause the calendar data shown therein and described above to be displayed. The user can modify the displayed data by simply replacing the text in any of the text entry fields 414—420 and 451–454. For instance, the user may replace the text in the "start" data field 416 so that it reads as "Tues. Feb. 25, 2003" instead of "Mon. Feb. 24, 2003." In this example, actuation of the "Save and Close" button 410 after the user enters the modification data in the scheduler interface 400, causes the modification data to be transmitted from the user's client computer 102 to the server 103, where the modification data is processed by the SharePoint® server application 180.

In this example, when the server 103 receives the modification data, the server 103 obtains the time at which the modification data was received, herein the "current time." The current time may be obtained by the server 103 from a number of sources, including, but not limited to, a clock running on the server 103, a time stamp included in the modification data, or any other mechanism that indicates time.

The above example, which shows the use of a graphical user interface to receive modification data, should be taken as illustrative and not limiting. The server 103 may receive modification request data in other ways. For instance, the server 103 may receive modification request data from a Web page having text entry fields, e-mail messages, etc.

For purposes of illustrating the present invention, a sample modification request is next described. This example of a modification request applies to the series of recurring calendar items described above with reference to FIG. 4. More specifically, this example involves the creation of a modification request to reschedule the recurring calendar items that occur on each Monday so each meeting occurs on a Tuesday. In this example, the time at which the modification request is made is 10:00 AM on Mar. 24, 2003. As will be appreciated by those skilled in the art, when a series of calendar items is stored in a standardized format, such as the one formed in accordance with the ISO 8601 standard, a modification request, such as the one provided in this example, would apply to each calendar item in the series of recurring calendar items. Thus, even if the modification request is made on Mar. 24, 2003, at 10 AM, the modification request would apply to all twenty original calendar item that were set to occur from Feb. 24, 2003, through Jul. 7, 2003.

The generation of the modification request causes two actions to occur. These events are shown in blocks 303 and 304 of FIG. 3. The first event is the creation of a new set of calendar items based on the modification request. The second event is the processing of the calendar items associated with the prior calendar entry. As will be better understood from the following description, modification requests do not cause all of the database records of existing calendar items to be immediately modified. Instead, the prior calendar items are individually analyzed and a modification decision is made based on the results of the analysis. For illustrative purposes, each existing calendar item that is subject to the modification request is referred to as a select calendar item. Thus, in the above example, the 20 recurring calendar items that are scheduled for each Monday starting on Feb. 24, 2003, are each considered to be a select calendar item since they are subject to the modification request.

As noted above, when a modification request changes the time or the date of a calendar entry, as shown in block 302, a new set of calendar items is created and stored. Thus, in this above-described modification request, the system generates a new calendar item for each new event scheduled in accordance with the modification request. Thus, in this example, a new calendar item would be established for 16 new future calendar items, starting on Tuesday, Mar. 25, 2003, and ending on Tuesday, Jul. 8, 2003. In one exemplary embodiment, the new calendar items created by the modification request are stored in a database, such as the calendar database 198, with the existing select calendar items.

Referring again to FIG. 3, upon receipt of a modification request, the calendar data processing method 300 proceeds to block 304 where the select calendar items, i.e., the items associated with the prior calendar entry, are processed. In a preferred embodiment, the process of block 304 does not apply to new calendar items created in the process of block 303. During processing, the select calendar items are each examined and selectively modified. As will be better understood from the following description, modification includes deletion. The processing, which is described in more detail below with reference to FIGS. 6A and 6B, prevents the modification of activated calendar items associated with past events. In addition, the processing allows users to selectively modify (update) the records of the select calendar items.

Figure 6A:
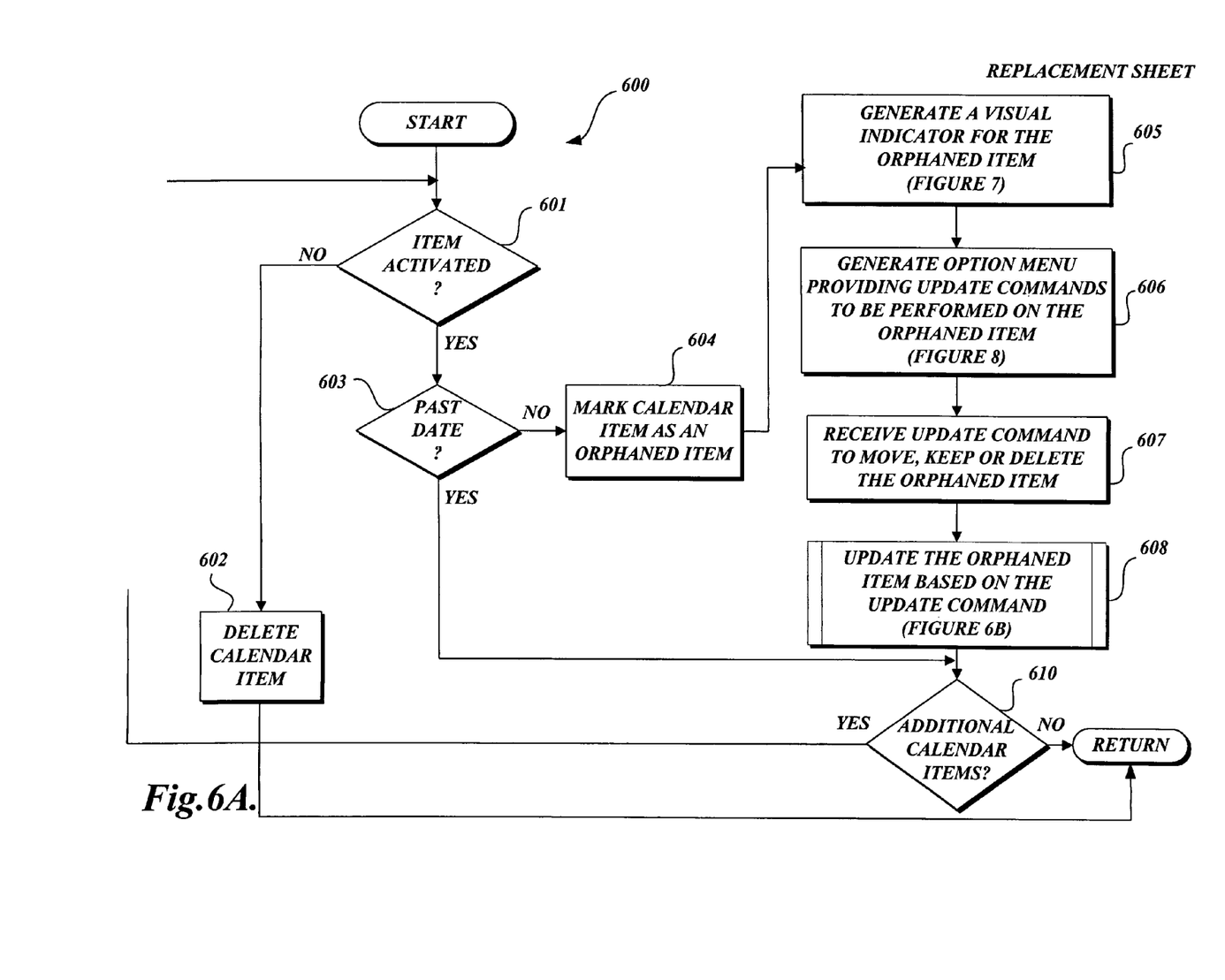
FIG. 6A is a flow diagram illustrating an exemplary method for processing a request to modify a calendar item suitable for use in FIG. 3.
Figure 6B:
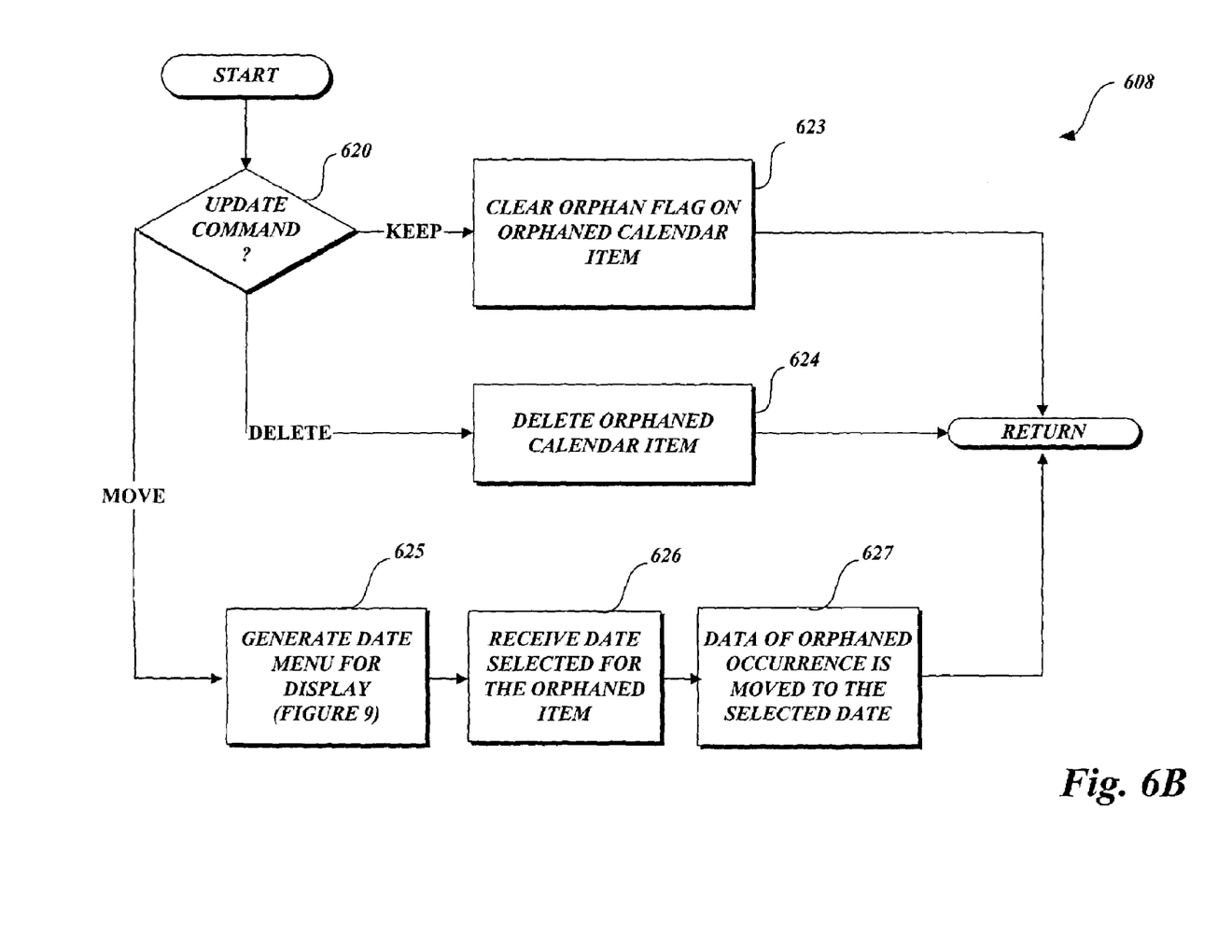
FIG. 6B is a flow diagram illustrating an exemplary method for updating an orphaned item based on an update command suitable for use in FIG. 6A.

FIGS. 6A and 6B are flow diagrams of one exemplary embodiment of an update method 600 for updating the records of the select calendar items. The process illustrated in FIGS. 6A and 6B are applied to each select calendar items to determine if the select calendar item is to be permanently updated. This should be taken as illustrative and not limiting. The present invention is not limited to analyzing individual select calendar items one at a time. If desired, each process block of FIGS. 6A and 6B may be simultaneously applied to multiple select calendar items.

The update method 600 begins at decision block 601 where the method determines if a select calendar item has been activated. If, at decision block 601, the select calendar item has not been activated, the update method 600 proceeds to block 602, where the select calendar item is deleted. For example, in applying the processes of blocks 601 and 602 to the list of calendar items shown in FIG. 5, the process of block 601 would delete the calendar items whose hyperlinks are not listed in bold text. More specifically, the processes of blocks 601 and 602 would delete the calendar items that are associated with the dates Mar. 3, 2003, Mar. 17, 2003, Mar. 31, 2003, Apr. 14, 2003, Apr. 28, 2003, Mar. 5, 2003, May 12, 2003, and May 19, 2003. For example, the processes of blocks 601 and 602 may update a calendar database 198 by deleting from the database the records of the select calendar items that are not activated. After process block 602, the update method 600 terminates, i.e., returns to the calling routine.

As will be appreciated by those of ordinary skill in the art, the process of block 602 can be implemented in many different ways. For instance, if the calendar items are stored in a recurrence pattern in accordance with the RFC 2445 standard, individual calendar items that are part of a series of the recurring event may be deleted by simply changing the variables related to a recurrence ID. As will be appreciated by those skilled in the art, modifications to the recurrence ID, which is a variable of the RFC 2445 standard, may be used to control the existence of individual calendar items.

If at decision block 601 it is determined that the select calendar item is activated, the routine proceeds to decision block 603 where the update method 600 determines if the date of the select calendar item is a past date. For purposes of illustrating one example of the present invention, the date of a select calendar item is considered to be a past date if the date of the select calendar item is prior to the time of the modification request, i.e., the "current time." For instance, if the modification request was generated on Mar. 24, 2003, select calendar items having a date prior to Mar. 24, 2003, are not updated. If the date of the select calendar item is prior to the time of the modification request, the update method 600 proceeds to decision block 610 to determine if additional select calendar items need to be processed. If there are no additional select calendar items for processing, the update method 600 terminates and returns to the calling process. However, at decision block 610, if it is determined that additional select calendar items exist, the update method 600 returns to decision block 601 to restart the update method 600 for the next select calendar item.

At decision block 603, if the date of the select calendar item is not a past date, the update method 600 proceeds block 604, where the select calendar item is marked as an orphaned item, i.e., an item having an "orphaned" status. The select calendar item may be marked as an orphaned item by setting a suitable flag associated with the select calendar item, for example.

Figure 7:
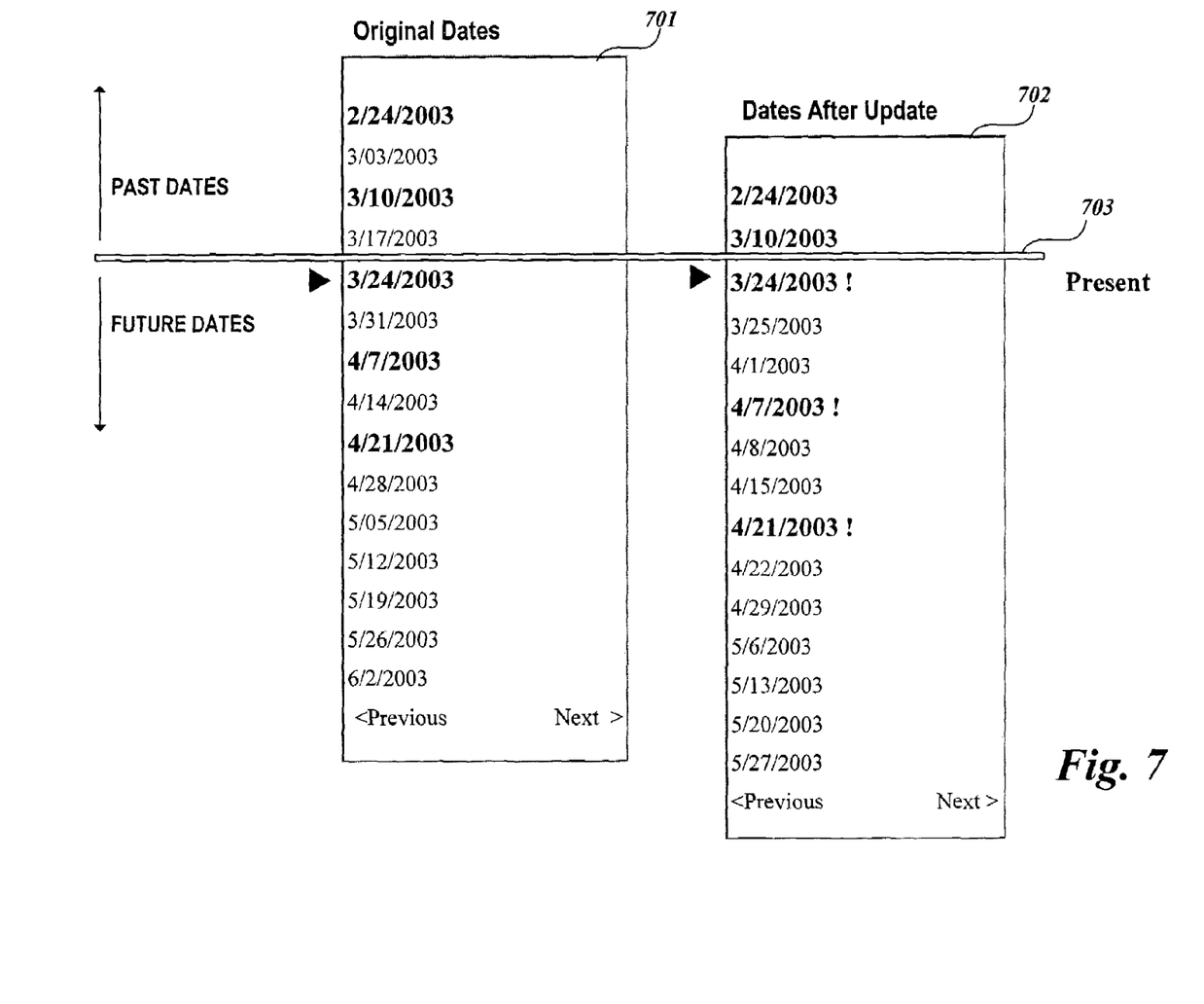
FIG. 7 is a pictorial diagram illustrating an exemplary section of a graphical user interface for displaying a list of original calendar items and a list of calendar items after the processing of a modification request.

Next, at block 605, the update method 600 generates a graphical visual indicator that brings focus to the orphaned calendar item. In one embodiment, the graphical visual indicator is a text character, such as an exclamation point. A sample of an exemplary graphical visual indicator is shown in FIG. 7. The right column of FIG. 7 is a list 702 of calendar item hyperlinks. Three of the hyperlinks, those with the dates of Mar. 24, 2003, Apr. 7, 2003, and Apr. 21, 2003, are marked with an exclamation point to indicate that they are orphaned calendar items. The graphical visual indicator allows a user to readily identify future events that do not comport with a valid calendar schedule, the future events relating to calendar items associated with a calendar entry that has been modified.

More specifically, the graphical visual indicator of FIG. 7 includes two hyperlink lists of calendar items, which show the results of the above-described processes. The first (left) list 701 includes the original calendar items that are created by the process of block 301 of FIG. 3. The second (right) list 702 includes the calendar items that are created by block 303 plus the orphan items resulting from the execution of process blocks 604 and 605. As shown in FIG. 7, the calendar items that are not bolded in the first list 701, i.e., the calendar items that were not activated, are not included in the second list 702. In addition, the orphaned items on the second list 702 are marked with the graphical visual indicator generated by process block 605. Showing a graphical visual indicator with the orphaned calendar items shows that these items need to be updated. For illustrative purposes, FIG. 7 also includes a graphical line 703 to show the "current time," which in this example is Mar. 24, 2003. The current time is included to show that the second list 702 also includes hyperlinks to the activated original calendar items have been preserved.

Referring again to FIG. 6A, the update method 600 continues at block 606 where a menu that lists update commands to be performed on the orphaned item is generated. Generally described, the process of block 606 provides a mechanism that allows a user to update orphaned items. An example of a menu generated by the process of block 606 is shown in FIG. 8.

Figure 8:
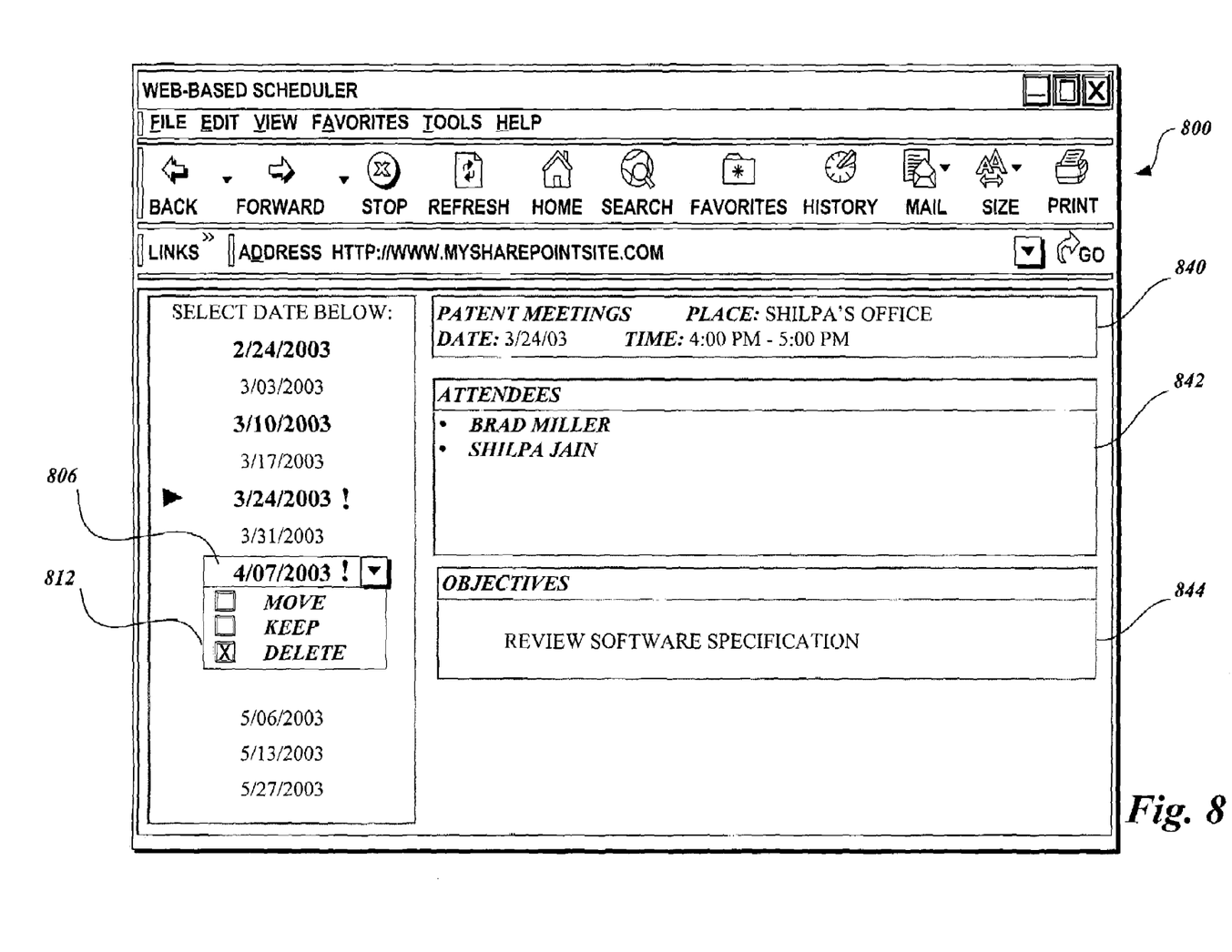
FIG. 8 is a pictorial diagram illustrating an exemplary graphical user interface for displaying a menu for a number of update commands according to the present invention.

FIG. 8 is a pictorial diagram of an exemplary calendar interface 800 that includes a menu 812 generated by the process of block 606. The calendar interface 800 shown in FIG. 8 is similar to the calendar interface 500 shown in FIG. 5. Among other items, the calendar interface 800 shown in FIG. 8 displays calendar data that includes attendee data 842, event description data 840 and objective data 844 associated with a selected hyperlink date.

The menu 812 is a drop-down menu that extends from a hyperlink 806 associated with an orphaned item. The menu 812 may be generated, for example, when a user selects the hyperlink 806 that represents the orphaned item. Alternatively, the menu 812 may be generated when a user simply directs, i.e., hovers, a pointer, such as a mouse pointer, over the hyperlink 806 that represents the orphaned item.

The exemplary menu 812 illustrated in FIG. 8 provides several update options, any of which may be applied to the orphaned item. More specifically, the exemplary menu 812 shown in FIG. 8 has three options—an option to move the orphaned item data to a new date, an option to keep the orphaned item at its current date, and an option to delete the orphaned item data. While these menu options are used to illustrate one working example of the present invention, it should be understood that the invention is not limited to these menu options. When a user selects one of the menu options an update command is communicated to the processing computer, i.e., the server computer 103 in the hereindescribed embodiment of the invention.

Referring again to FIG. 6A, the update method 600 continues at block 607, where the update command (i.e., the menu option selection) is received. The update command may be in the form of text instructions, code, or any other data format suitable for communicating the selected menu option. Upon receipt of the update command, the update method 600 continues at block 608 where the record of the orphaned item is updated based on the selected menu option. FIG. 6B illustrates one exemplary block 608 process.

As shown in FIG. 6B, at decision block 620 the update command is interpreted. If, at decision block 620, it is determined that the selected menu option is to keep the orphaned item, the update method 600 proceeds to block 623, where the update command method 608 clears the memory flag that marks the calendar item as an orphaned item. After the orphaned calendar item is cleared of the "orphaned" status, the calendar item will appear on a calendar list as a regular activated calendar item. After the completion of the process of block 623, the update command method 608 terminates.

If, at decision block 620, it is determined that the selected menu option is to delete the orphaned item, the update command method 608 proceeds to block 624, where the records of the orphaned item are deleted from memory. After the completion of the process of block 624, the update command method 608 terminates.

If, at decision block 620, it is determined that the selected menu option is to move the orphaned item to a new date, the update command method 608 proceeds to block 625 where a date menu is generated for display. Generally described, the process of block 625 generates a list of dates. Selection of one of the displayed dates by the user results in the orphaned item data being transferred to the calendar item data associated with the selected date.

Figure 9:
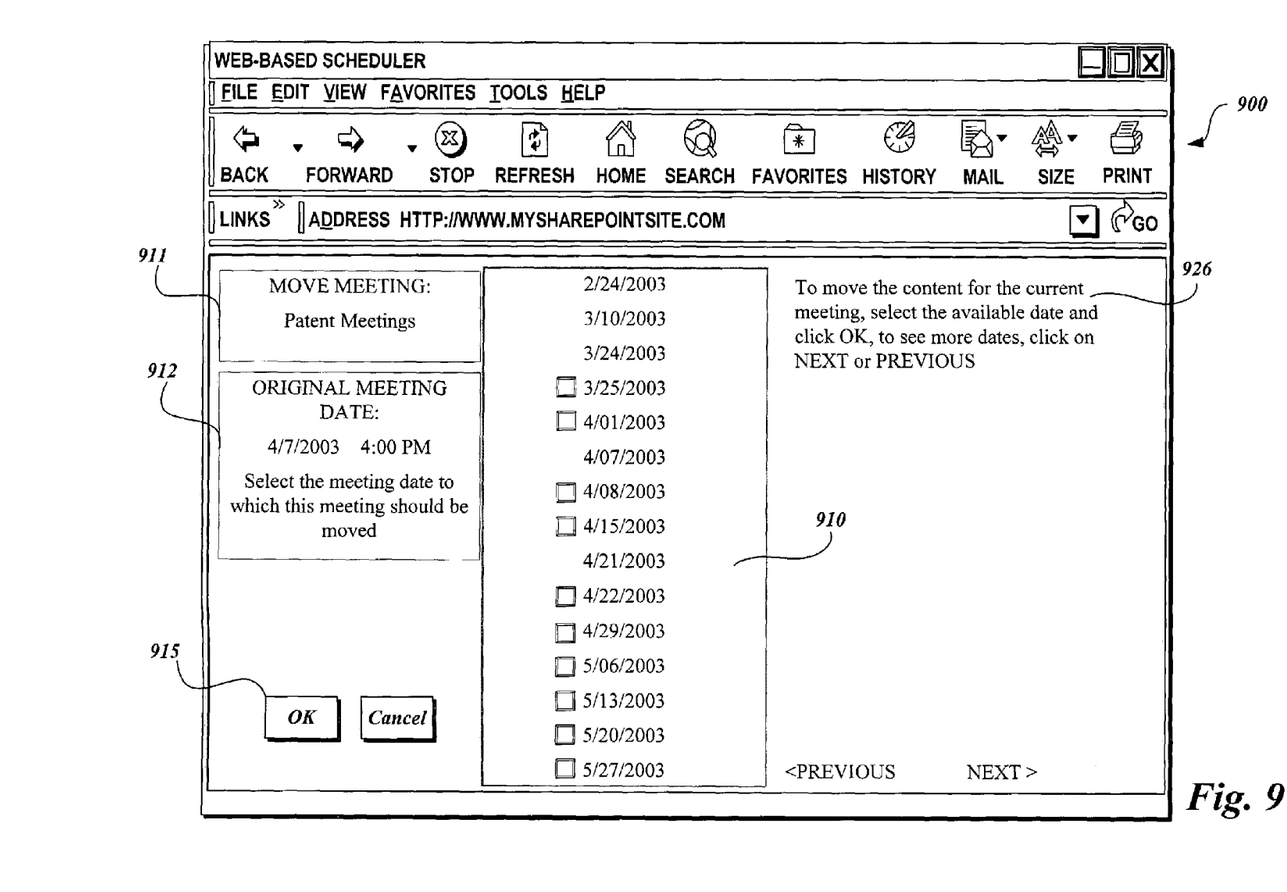
FIG. 9 is a pictorial diagram illustrating an exemplary graphical user interface for displaying a number of calendar dates according to the present invention.

FIG. 9 illustrates an exemplary graphical user interface, referred to as a date selection interface 900, generated by the process of block 625. In this example, a list of dates 910 that a user may select as the new date for the orphaned item is displayed. The list includes a number of calendar item dates that are stored in the user's contact database. In one preferred embodiment, the list of dates 910 would include all of the non-orphaned calendar items. For example, the list of dates 910 may include all of the new calendar items created in the process of block 303, and all other existing calendar items that were not marked as an orphaned calendar item in the process of block 604. Located adjacent to the dates are radial buttons, also referred to as checkable blocks, which allow a user to select a date. The graphical user interface 900 also includes several fields that describe the orphaned item. More specifically, the illustrated exemplary date selection interface 900 includes a calendar item description field 911 and a calendar item information field 912, each containing information related to the orphaned item.

The date selection interface 900 may also display instructions 926 to guide a user through the steps of selecting a date associated with a checkable calendar item for the orphaned item data to be transferred to. After the user selects one of the available (checkable) dates in the list 910, the actuation of a control button 915 by the user adds the orphaned item data to the calendar item data associated with the selected date.

FIG. 9 illustrates an example wherein a user desires to move orphan item data associated with the date of Apr. 7, 2003 to a checkable calendar item associated with another date. If the user selects, for example, the date of Apr. 8, 2003, all of the orphaned item data will be added to the calendar item data associated with the Apr. 8, 2003 date. Thus, all attached files and other calendar data would be transferred to this new selected date.

Upon the completion of the process of block 627, the update method 600 terminates. The termination of the update method 600 also completes the calendar data processing method 300.

As will be appreciated by those skilled in the art, the above-described embodiments may have additional features to accommodate different needs. For instance, in one alternative embodiment, activated calendar items that are scheduled in the past may be deleted or "hidden" in certain circumstances. In one embodiment, if an activated past calendar item is scheduled in the same calendar day as the modification request, the activated past calendar item may be deleted or otherwise removed from the calendar view. For example, if a meeting is scheduled for 9:00 AM and, at 9:01 AM it is decided that the meeting should be rescheduled to 11:00 AM, the calendar item scheduled for 9:00 AM may be moved to 11:00 AM even though the calendar item has been activated and is scheduled in the past.

In accordance with another embodiment of the present invention, the above-described update method 600 may only be executed in response to modification requests to recurring calendar events. Thus, for example, if a user submits a request to modify a single calendar item in the process of block 302 of FIG. 3, the process of block 304 would not execute. Instead, the process may simply remove the single modified calendar item from the series of recurring calendar items, and create a standalone calendar item having a time and date formed in accordance with the modification request. In the above-described example involving the twenty calendar items that start on Feb. 24, 2003, if a user requests to modify the calendar entry of Mar. 10, 2003 to a future date beyond the last date of the twenty calendar items, an exception would be created in the recurrence ID defining the twenty calendar items, and a single calendar item representing the modified calendar date would be created.

As will be apparent from the foregoing description, the invention provides a computer-implementable method for managing modifiable calendar items in a way that preserves data associated with past calendar items allows users to control the transfer of data associated with future calendar items.

While several embodiments of the invention have been illustrated and described, it will be appreciated that various changes can be made therein without departing from the spirit and scope of the invention. Similarly, any process steps described herein might be interchangeable with other steps in order to achieve the same result. In addition, the illustrative examples described above are not intended to be exhaustive or to limit the invention to the precise forms disclosed. For instance, examples of methods where data is received by client computer for processing may be processed by a server and vice versa.

The embodiments of the invention in which an exclusive property or privilege is claimed are defined as follows:

1. A method for creating and managing a plurality of calendar entries implemented in a computer, comprising:
 (a) in response to user input, causing the computer to create the calendar entries, each calendar entry including at least one calendar item, the at least one calendar item including associated calendar data, the associated calendar data including a particular time;
 (b) in response to receiving a user request to modify the calendar entries, causing the computer to determine a current time associated with the user request and for each calendar entry causing the computer to:
  (i) determine if the calendar item is activated;
  (ii) determine if the particular time included in the calendar data associated with the calendar item is subsequent to the current time;
  (iii) generate a display requesting a user update for the calendar item if the calendar item is activated and if the particular time included in the calendar data associated with the calendar item is subsequent to the current time, wherein the display requesting an update for the calendar item comprises an option for keeping the calendar item, an option for modifying the calendar item, and an option for deleting the calendar item; and wherein the method further comprises:
   (a) if the update indicates that the calendar item is to be deleted, causing the computer to automatically delete the calendar item;
   (b) if the update indicates that the calendar item is to be kept, causing the computer to automatically remove from the display a visual indicator indicating that the calendar item needs to be updated; and
   (c) if the update indicates that the calendar item is to be modified, the method further comprises:
    (i) causing the computer to automatically generate a menu of available times to which the particular time included in the calendar data associated with the calendar item can be changed to; and
    (ii) in response to receiving an indication of a selected time from the menu of available times, causing the computer to automatically update the particular time included in the calendar data associated with the calendar item;
  (iv) selectively update the calendar data associated with the calendar item in response to receiving a user update; and
  (v) causing, without further user input, the computer to automatically delete the calendar item if the calendar item is not activated.

2. The method of claim 1, further comprising, if the calendar item is activated and if the particular time included in the calendar data included in the calendar item precedes the current time, causing, without further user input, the computer to prevent the updating of the calendar data associated with the calendar item.

3. The method of claim 1, further comprising, in response to receiving a command to display the calendar data associated with the calendar item, causing the computer to display the calendar data, and visually indicate that the calendar item is activated.

4. The method of claim 1, further comprising, if the calendar item is activated and if the particular time included in the calendar data associated with the calendar item is subsequent to the current time, causing the computer to display a visual indicator indicating that the calendar item needs to be updated.

5. The method of claim 1, wherein the calendar entry includes a plurality of calendar items.

6. A computer-readable storage medium containing computer-readable instructions which, when executed by a computer, performs the method of any one of claims 1, 2–4, or 5.

7. A computer-controlled system for performing the method of any one of claims 1, 2–4, or 5.

8. A method for managing a series of calendar items, wherein each calendar item of the series of calendar items is associated with a particular time and date, wherein the method comprises:

in response to receiving a request to modify the series of calendar items, causing a computer to determine a current time associated with the request and for each calendar item of the series of calendar items causing the computer to:

(i) determine if the calendar item is activated;

(ii) determine if the particular time included in the calendar data associated with the calendar item is subsequent to the current time;

(iii) generate a display requesting a user update for the calendar item if the calendar item is activated and if the particular time included in the calendar data associated with the calendar item is subsequent to the current time, wherein the display requesting an update for the calendar item comprises an option for keeping the calendar item, an option for modifying the calendar item, and an option for deleting the calendar item; and wherein the method further comprises:

(a) if the update indicates that the calendar item is to be deleted, causing the computer to automatically delete the calendar item;

(b) if the update indicates that the calendar item is to be kept, causing the computer to automatically remove from the display the visual indicator indicating that the calendar item needs to be updated; and (c) if the update indicates that the calendar item is to be modified, the method further comprises:

(i) causing the computer to automatically generate a menu of available times to which the particular time included in the calendar data associated with the calendar item can be changed to; and (ii) in response to receiving an indication of a selected time from the menu of available times, causing the computer to automatically update the particular time included in the calendar data associated with the calendar item;

(iv) selectively update the calendar data associated with the calendar item in response to receiving a user update; and (v) causing, without further user input, the computer to automatically delete the calendar item if the calendar item is not activated.

9. The method of claim 8, further comprising, if the calendar item is activated and if the particular time included in the calendar data included in the calendar item precedes the current time, causing, without further user input, the computer to prevent the updating of the calendar data associated with the calendar item.

10. The method of claim 8, further comprising, in response to receiving a command to display the calendar data associated with the calendar item, causing the computer to display the calendar data, and visually indicate that the calendar item is activated.

11. The method of claim 8, further comprising, if the calendar item is activated and if the particular time included in the calendar data associated with the calendar item is subsequent to the current time, causing the computer to display a visual indicator indicating that the calendar item needs to be updated.

12. A computer-readable storage medium containing computer-readable instructions which, when executed by a computer, performs the method of any one of claims 8, or 9–11.

13. A computer-controlled system for performing the method of any one of claims 8, or 9–11.

* * * * *